United States Patent [19]

Kurihara et al.

[11] 4,352,293

[45] Oct. 5, 1982

[54] METHOD OF DIAGNOSING VIBRATION OF ROTARY MACHINE

[75] Inventors: Nobuo Kurihara, Hitachiota; Mitsuyo Nishikawa, Hitachi; Yoshitoshi Nagahashi, Hitachi; Masafumi Takechi, Hitachi, all of Japan

[73] Assignee: Hitachi, Ltd., Tokyo, Japan

[21] Appl. No.: 180,583

[22] Filed: Aug. 25, 1980

[30] Foreign Application Priority Data

Aug. 24, 1979 [JP] Japan ............................ 54-107086

[51] Int. Cl.³ ............................................. G01N 29/04
[52] U.S. Cl. .......................................... 73/593; 73/660
[58] Field of Search .................................. 73/660, 593

[56] References Cited

U.S. PATENT DOCUMENTS

3,603,140 9/1971 Spencer ................................. 73/660
3,733,892 5/1973 Rennick ................................ 73/660
4,078,434 3/1978 Weberhofer ......................... 73/593

*Primary Examiner*—Anthony V. Ciarlante
*Attorney, Agent, or Firm*—Antonelli, Terry & Wands

[57] ABSTRACT

In a rotary machine mounted on a rotary shaft journaled in journal bearings, a source of unusual vibration of the rotary machine is identified on the basis of the results of the steps of (1) subjecting a shaft vibration signal to frequency analysis for analyzing its frequency distribution, and (2) analyzing the amplitude of the shaft vibration signal and the variation rate of a phase signal of a component related to the shaft rotation frequency among the frequency components of the shaft vibration signal. The present invention is usefully applicable to diagnosis of vibration of a rotary shaft of a large-size turbine or a generator in a power plant by continuously monitoring the shaft vibration for immediately automatically detecting unusual vibration of the rotary machine in the event of occurrence of such unusual vibration. The usefulness is more enhanced when the signal indicative of vibration of the rotary shaft is converted into a digital signal to be analyzed by a digital computer which identifies the source of unusual vibration.

10 Claims, 11 Drawing Figures

OCCURRENCE RATE
(OCCURRENCES/SEC)

$-\pi$/SEC    0    $+\pi$/SEC

OVERALL VARIATION RATE

FIG. 4b $-\pi$/SEC    0    $+\pi$/SEC
OVERALL VARIATION RATE

FIG. 4c $-\pi$/SEC    0    $+\pi$/SEC
OVERALL VARIATION RATE

FIG. 5

| | | | | | |
|---|---|---|---|---|---|
| SHAFT VIBRATION INDICATIVE VECTOR GROUP | FREQUENCY SPECTRUM | FCI | 0 | 0 | 1 |
| | | R/3 | 0 | 0 | 0 |
| | | R/2 | 0 | 0 | 0 |
| | | R | 1 | 1 | 0 |
| | | 2R | 0 | 0 | 0 |
| | TIME-RELATED VARIATION (AMPLITUDE, PHASE) | ABRUPT VARIATION | 0 | 0 | 0 |
| | | IRREGULAR VARIATION | 0 | 0 | 0 |
| | | GRADUAL VARIATION | 0 | 0 | 1 |
| CORRELATION VARIABLE INDICATIVE VECTOR GROUP | RANGE | HIGH | 1 | 0 | 0 |
| | | LOW | 0 | 1 | 0 |

| | | | | |
|---|---|---|---|---|
| 1 | 0 | 0 | SOURCE(1) | SOURCE GROUP |
| 0 | 1 | 0 | SOURCE(2) | |
| 0 | 0 | 1 | SOURCE(3) | |

FIG. 6

METHOD OF DIAGNOSING VIBRATION OF ROTARY MACHINE

BACKGROUND OF THE INVENTION

This invention relates to a method of diagnosing vibration of a rotary machine whose rotary shaft is journaled in journal bearings, and more particularly to a method of the kind above described in which the rotation of the rotary shaft of the rotary machine is continuously monitored for the purpose of detection of unusual vibration of the rotary shaft so that, in the event of occurrence of unusual vibration, the defective parts which would cause the unusual vibration can be determined.

Figure 1:
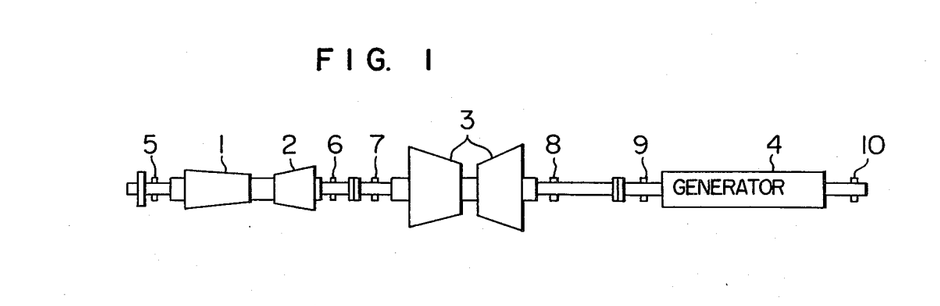
FIG. 1 shows schematically the arrangement of rotary units in a power plant to which the present invention is applied.
Figure 2:
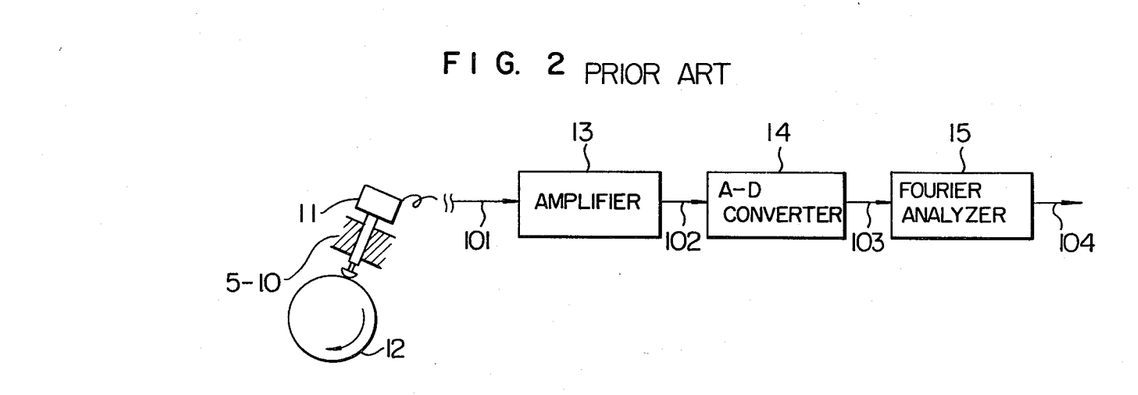
FIG. 2 is a block diagram of a prior art apparatus used for the vibration diagnosis.

Monitoring of vibration of rotary shafts of steam turbines and an electric generator in a power plant, such as an oil-fired power plant or an atomic power plant, occupies a great proportion of plant maintenance. FIG. 1 shows rotary units in such a power plant. In FIG. 1, rotary shafts of a high-pressure turbine 1, an intermediate-pressure turbine 2, a low-pressure turbine 3 and an electric generator 4 in a power plant are connected together and journaled in bearings such as journal bearings 5 to 10 as shown. A shaft vibration meter 11 is mounted on each of these journal bearings 5 to 10 to detect vibration of each of the rotary shafts 12 as shown in FIG. 2. The shaft vibration output signals 101 from the individual shaft vibration meters 11 are applied to a central control panel in which the input signals are sequentially scanned in the order of from the bearing 5 to the bearing 10, and the detected values of shaft vibration are displayed on individual meters for the purpose of monitoring the state of vibration of the shafts 12 and are, at the same time, recorded on a recording sheet by a recorder such as a dot-print recorder. When the amplitude of vibration of the rotary shaft of any one of the turbines exceeds a first allowable limit, an alarm signal is generated, and when it exceeds a second allowable limit larger than the first allowable limit, the turbines are tripped to be protected against damage. When such unusual vibration is detected, the detected shaft vibration signal 101 from the specific vibration meter 11 is amplified by an amplifier 13, and an amplified shaft vibration signal 102 from the amplifier 13 is then converted into a digital shaft vibration signal 103 by an A-D converter 14. The digital shaft vibration signal 103 from the A-D converter 14 is then applied to a Fourier analyzer 15 to derive a frequency spectrum signal 104 from the Fourier analyzer 15. This frequency spectrum signal 104 is examined for detecting variations in various frequency components so as to find the source of unusual vibration. Such a method of vibration diagnosis is described in, for example, an article entitled "Early diagnosis of dynamic unbalances and misalignments in large turbogenerators" which appeared in the magazine "Energia Nucleare" Vol. 23/n.5/Maggio 1976, pp. 271–277.

However, such a prior art method has not been satisfactory for the following reasons, among others, for the accurate identification of the source of unusual vibration:

(1) Difficulty is encountered in the comparison with past data of the frequency components.

(2) Continuous recording and tracing of records is required to detect trend in variation in the frequency components which may occur at indefinite timing. However, a great deal of labor is required to detect such variations whose occurrences are unpredictable.

(3) The factor of frequency components only is not enough for the accurate identification of the source of unusual vibration in many cases.

SUMMARY OF THE INVENTION

With a view to obviate the aforementioned difficulties encountered with the prior art method, it is a primary object of the present invention to provide a novel and improved method of diagnosing vibration of a rotary machine so as to attain early detection of unusual vibration of the rotary machine under operation and accurately identify the source of detected unusual vibration.

In accordance with the present invention which attains the above object, there is provided a method of diagnosing vibration of a rotary machine in which a shaft vibration signal indicative of vibration of a rotary shaft journaled to journal bearings is continuously detected to detect unusual vibration of the rotary machine, the method comprising the steps of subjecting the shaft vibration signal to frequency analysis for comparing the levels of its frequency components with individual predetermined settings, and analyzing the amplitude of the shaft vibration signal and the variation rate of a phase signal of a component related to the shaft rotation frequency component among the frequency components for comparing the results of the analysis with predetermined settings, thereby to identify the source of unusual vibration of the rotary machine on the basis of the results of the above steps.

The present invention identifies the source of unusual vibration of a rotary machine by noting the following facts:

(1) The shaft rotation frequency, its harmonic components and the natural frequency components of a rotary machine are different in their levels.

(2) Variations in the level, phase or overall vibration value of the individual components in (1) are classified into a plurality of characteristic patterns, that is, an abrupt variation pattern, an irregular variation pattern and a gradual variation pattern when plotted relative to time.

(3) There are plant variables other than the shaft vibration. For example, there are plant variables such as a casing vibration, oil flow rate, steam temperature and steam pressure. (Generally, however, these plant variables tend to fluctuate depending on the plant operating condition even when unusual vibration of the rotary shaft does not occur.)

Therefore, the present invention proposes that the source of unusual vibration of the rotary machine can be accurately identified when frequency analysis of the shaft vibration signal is combined with analysis of a trend in variation of the shaft vibration signal. It also proposes that the source of unusual vibration can be more accurately identified when correlation analysis of the plant variables, other than the shaft vibration signal, for detecting variations of the plant variables in concurrent relation with the occurrence of unusual vibration is combined with the frequency analysis and the trend analysis.

DESCRIPTION OF THE PREFERRED EMBODIMENTS

Figure 3:
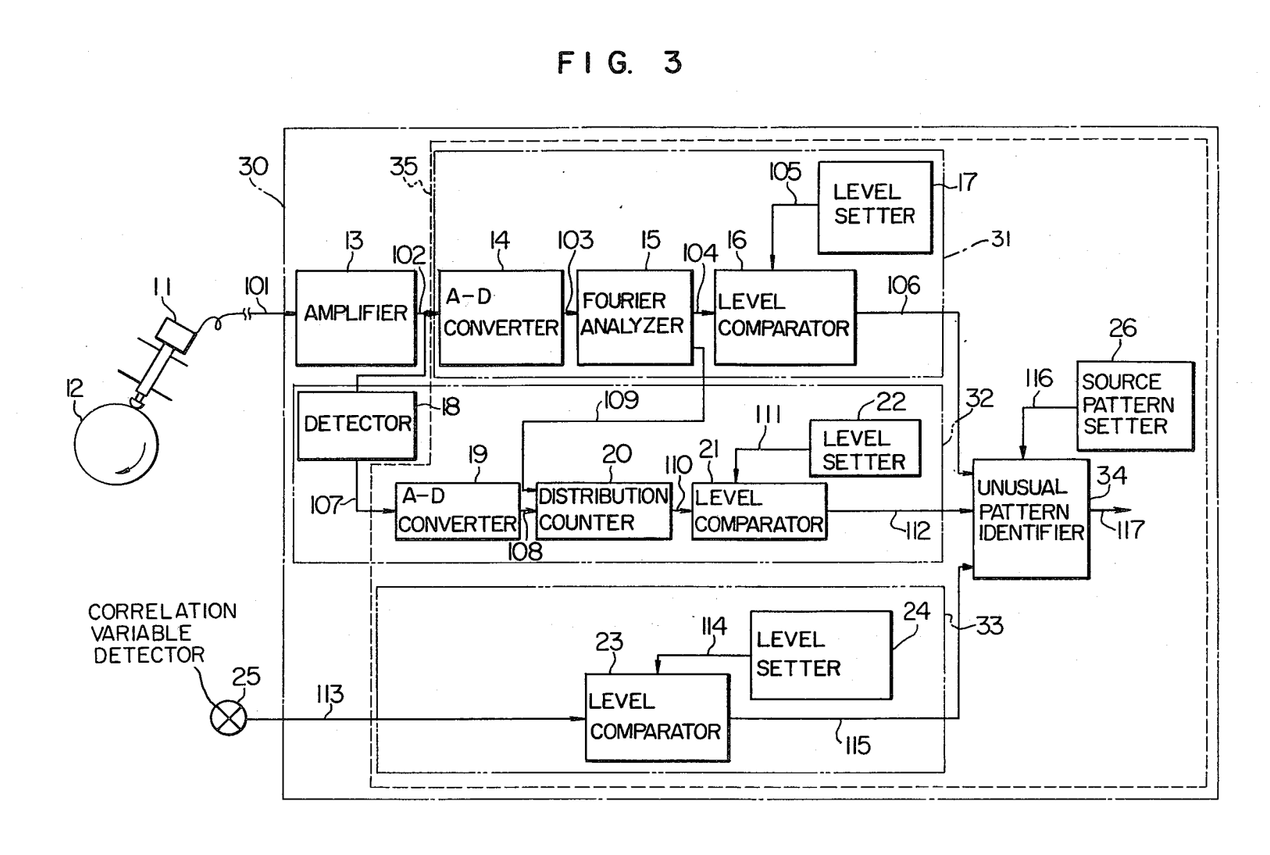
FIG. 3 is a block diagram of a vibration diagnosis apparatus employed for the practice of an embodiment of the method according to the present invention.

Referring now to FIG. 3 showing in a block diagram the structure of an apparatus preferably employed for the practice of an embodiment of the method of vibration diagnosis according to the present invention, the illustrated vibration diagnosis apparatus is generally designated by the numeral 30 and comprises, in a broad aspect, a harmonic analyzer 31, a trend analyzer 32, a correlation analyzer 33 and an unusual pattern identifier 34. The harmonic analyzer 31 is composed of a first A-D converter 14, a Fourier analyzer 15, a first level comparator 16 and a first level setter 17. The trend analyzer 32 is composed of a first detector-rectifier 18, a second A-D converter 19, an occurrence-frequency distribution counter 20, a second level comparator 21 and a second level setter 22. The correlation analyzer 33 is composed of a third level comparator 23 and a third level setter 24. A correlation variable detector 25 is connected to the third level comparator 23, and the apparatus 30 further includes a first amplifier 13, and a source pattern setter 26 which is connected to the unusual pattern identifier 34. The harmonic analyzer 31, the parts of the trend analyzer 32 except the detector-amplifier 18, the correlation analyzer 33, the unusual pattern identifier 34 and the source pattern setter 26 are shown enclosed in a dotted block 35 to illustrate that their functions are provided by a computer 35.

The harmonic analyzer 31 is similar to a conventional one. Thus, a detected shaft vibration signal 101 is amplified by the first amplifier 13 into an amplified shaft vibration signal 102, and this signal 102 is converted by the first A-D converter 14 into a digital shaft vibration signal 103 which is applied to the Fourier analyzer 15. The Fourier analyzer 15 analyzes the signal 103 to detect the levels and phases of individual frequency components of the shaft vibration signal. A frequency spectrum signal 104 indicative of the levels of the following five frequency components (1) to (5) extracted from the shaft vibration signal is applied from the Fourier analyzer 15 to the first level comparator 16:

(1) Primary natural frequency ($FC_1$) component
(2) Rotation frequency/3 (R/3) component
(3) Rotation frequency/2 (R/2) component
(4) Rotation frequency (R) component
(5) 2×rotation frequency (2R) component In the first level comparator 16, the levels of the individual specific frequency components provided by the frequency spectrum signal 104 are compared with corresponding settings provided by a spectrum setting signal 105 applied from the first level setter 17, and when the level of any one of the specific frequency components provided by the frequency spectrum signal 104 exceeds the corresponding setting provided by the spectrum setting signal 105, an unusual spectrum signal 106 indicative of that frequency component appears from the first level comparator 16 to be applied to the unusual pattern identifier 34.

Figure 4A:
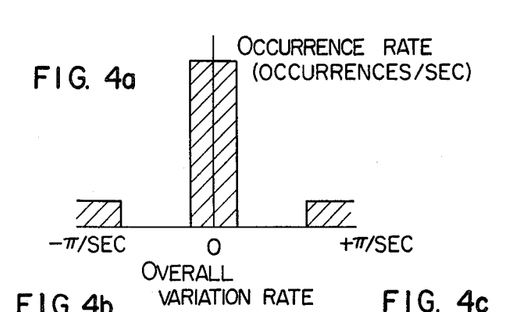
FIGS. 4a to 4c illustrate a plurality of occurrence-frequency distribution patterns used in the present invention for the time-related analysis of the shaft vibration signal.
Figure 4B:
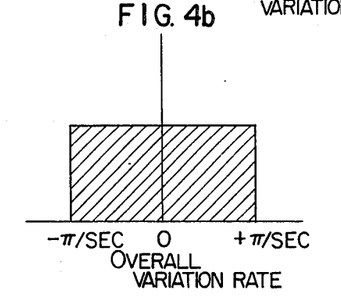
Figure 4C:
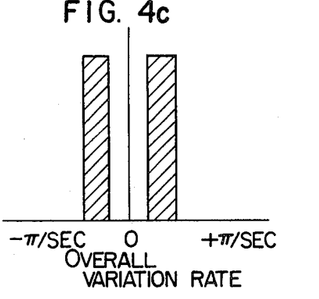

The amplified shaft vibration signal 102 from the first amplifier 13 is applied also to the trend analyzer 32. In this analyzer 32, the signal 102 is converted into an overall vibration signal 107 by the first detector-rectifier 18, and this signal 107 is then converted by the second A-D converter 19 into a digital overall vibration signal 108 which is applied to the occurrence-frequency distribution counter 20. A phase signal 109 indicative of the phase of the shaft rotation frequency (R) component obtained by the analysis in the Fourier analyzer 15 is also applied to the distribution counter 20 thereby to produce an occurrence frequency distribution in a predetermined period of time as described hereinafter. An occurrence-frequency distribution pattern signal 110 indicative of the occurrence frequency of level variation counted by the distribution counter 20 is applied to the second level comparator 21 in which the detected distribution pattern is compared with individual distribution pattern settings, as shown in FIGS. 4a to 4c, provided by an occurrence-frequency distribution pattern setting signal 111 applied from the second level setter 22. When a coincidence with any one of the occurrence-frequency distribution pattern settings is detected, an unusual occurrence-frequency distribution pattern signal 112 indicative of the specific occurrence-frequency distribution pattern appears from the second level comparator 21 to be applied to the unusual pattern identifier 34. FIG. 4a illustrates an abrupt variation pattern in which variation in the occurrence rate of measured values of a variable is especially large, such that the occurrence rate of the variable is very high for those values in a narrow range, the variable does not substantially occur at both sides of the narrow range, and the occurrence rate of the variable is low for values in the ranges spaced from the narrow range at opposite sides thereof. FIG. 4b illustrates an irregular variation pattern in which the values of the variable are scattered over a wide range. FIG. 4c illustrates a gradual variation pattern in which the variation in occurrence rate of measured values of a variable are large, such that the occurrence frequency of the variable is large for those values in the spaced, narrow ranges and the variable substantially does not occur in the other ranges.

The correlation variable detector 25 generates a correlation signal 113 indicative of a plant variable, other than the shaft vibration, which varies necessarily in response to occurrence of a specific unusual shaft vibration. This signal 113 is applied to the third level comparator 23 in the correlation analyzer 33 to be compared with a correlation variable setting signal 114 applied from the third level setter 24. When the level of the signal 113 deviates from the setting provided by the signal 114, an unusual correlation variable signal 115 appears from the third level comparator 23 to be applied to the unusual pattern identifier 34.

Figure 5:
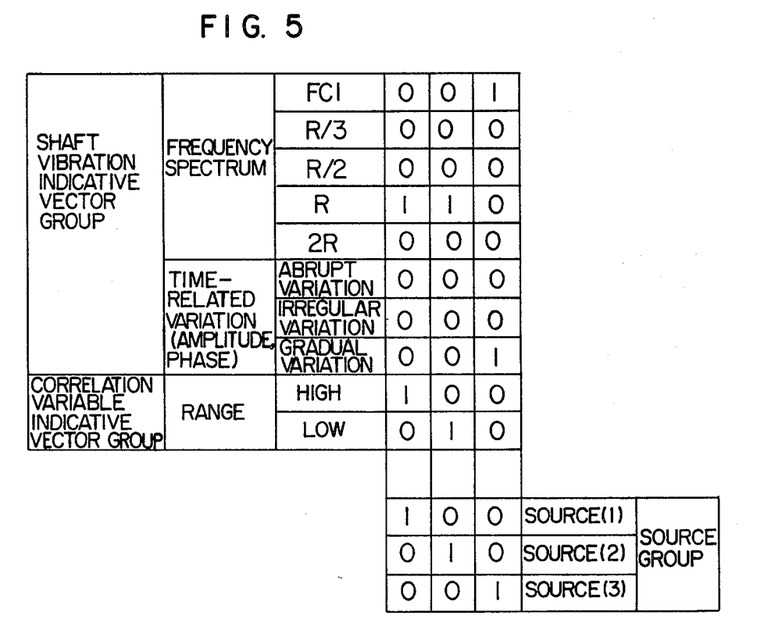
FIG. 5 illustrates a table of source patterns used in the present invention for the identification of an unusual pattern.

In response to the application of the unusual spectrum signal 106 from the harmonic analyzer 31, the unusual occurrence frequency distribution pattern signal 112 from the trend analyzer 32 and the unusual correlation variable signal 115 from the correlation analyzer 33, the unusual pattern identifier 34 compares these input signals with each of a plurality of source patterns, as shown in FIG. 5, set in the source pattern setter 26 and applied by a source pattern signal 116. When a coincidence with any one of these source patterns is detected, this specific source pattern is selected, and a source pattern identification signal 117 indicative of the selected source pattern appears from the unusual pattern identifier 34.

Figure 6:
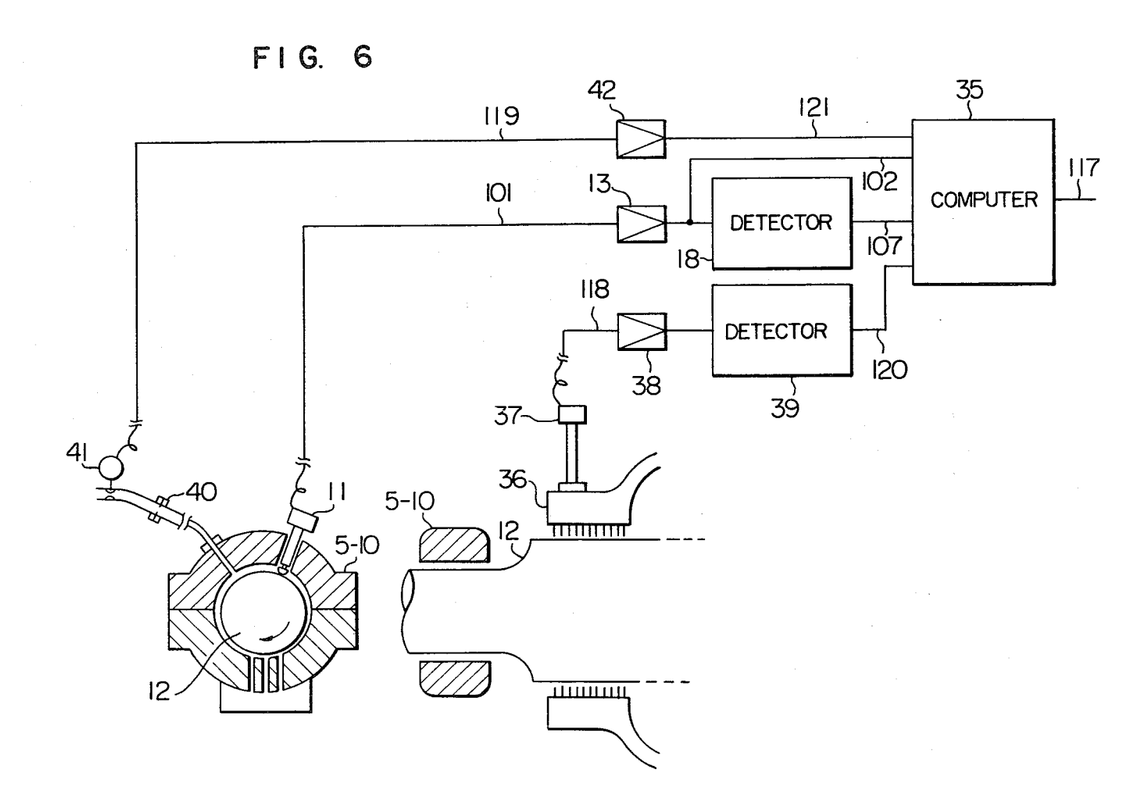
FIG. 6 shows schematically the structure of part of the vibration diagnosis apparatus employed for the practice of the method according to the present invention when a casing vibration signal and an oil flow-rate signal are used as the correlation signals.
Figure 7:
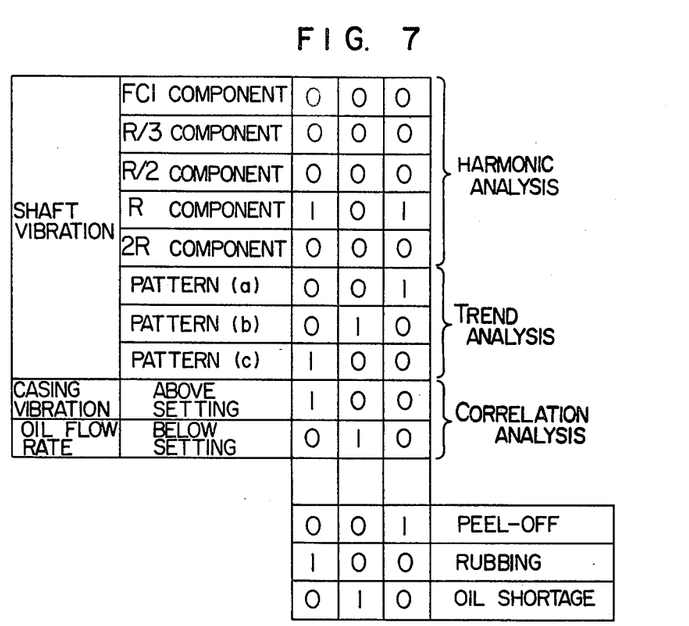
FIG. 7 illustrates a table of source patterns used in the method of vibration diagnosis shown in FIG. 6.
Figure 8:
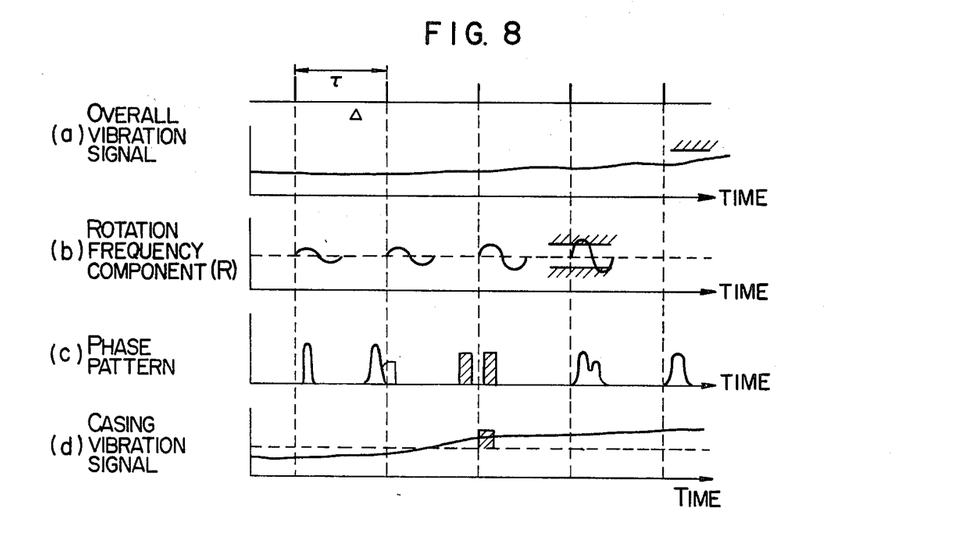
FIG. 8 illustrates how the waveforms of various signals vary in the event of occurrence of unusual vibration.

When, for example, a casing vibration signal 120 and an oil flow-rate signal 121 as shown in FIG. 6 are used as the correlation signals 113, these signals 120 and 121 are applied to the computer 35 together with the amplified shaft vibration signal 102 and the overall vibration signal 107. The source of unusual vibration can be identified in a manner as shown in FIG. 8 when source patterns as shown in FIG. 7 are employed. The casing vibration signal 120 above described is obtained by amplifying by a second amplifier 38 a detected casing vibration signal 118 generated from a vibration meter 37 of acceleration type mounted on a portion 36 of the casing and then passing the signal 118 through a second detector-rectifier 39. Also, the oil flow-rate signal 121 above described is obtained by detecting by an oil flow meter 41 the flow rate of lubricating oil supplied to the journal bearing through an orifice 40 and amplifying by a third amplifier 42 a detected oil flow-rate signal 119 appearing from the oil flow meter 41.

The manner of identification of the source of unusual vibration will be described with reference to FIG. 8. When rubbing occurs on the metal of the journal bearing at the time indicated by the symbol $\Delta$ in FIG. 8, the level of the shaft rotation frequency component R exceeds the setting shown by the hatched region, and the phase pattern shown by the hatching coincides with the gradual variation pattern illustrated in FIG. 4c. In this case, the level of the casing vibration signal 120 becomes unusually high and exceeds the setting shown by the hatching in FIG. 8. In such a situation, the $FC_1$ component is not large or "0", the R/3 component is not large or "0", the R/2 component is not large or "0", the R component is large or "1", the pattern (a) is not present or "0", the pattern (b) is not present or "0", the pattern (c) is present or "1", the casing vibration level exceeds the setting or is "1", and the oil flow rate is smaller than the setting or "0". Consequently, an unusual pattern "0001000110" is obtained. In FIG. 8, the symbol $\tau$ designates a period of time during which one cycle of sampling for analyzation is performed.

Figure 9:
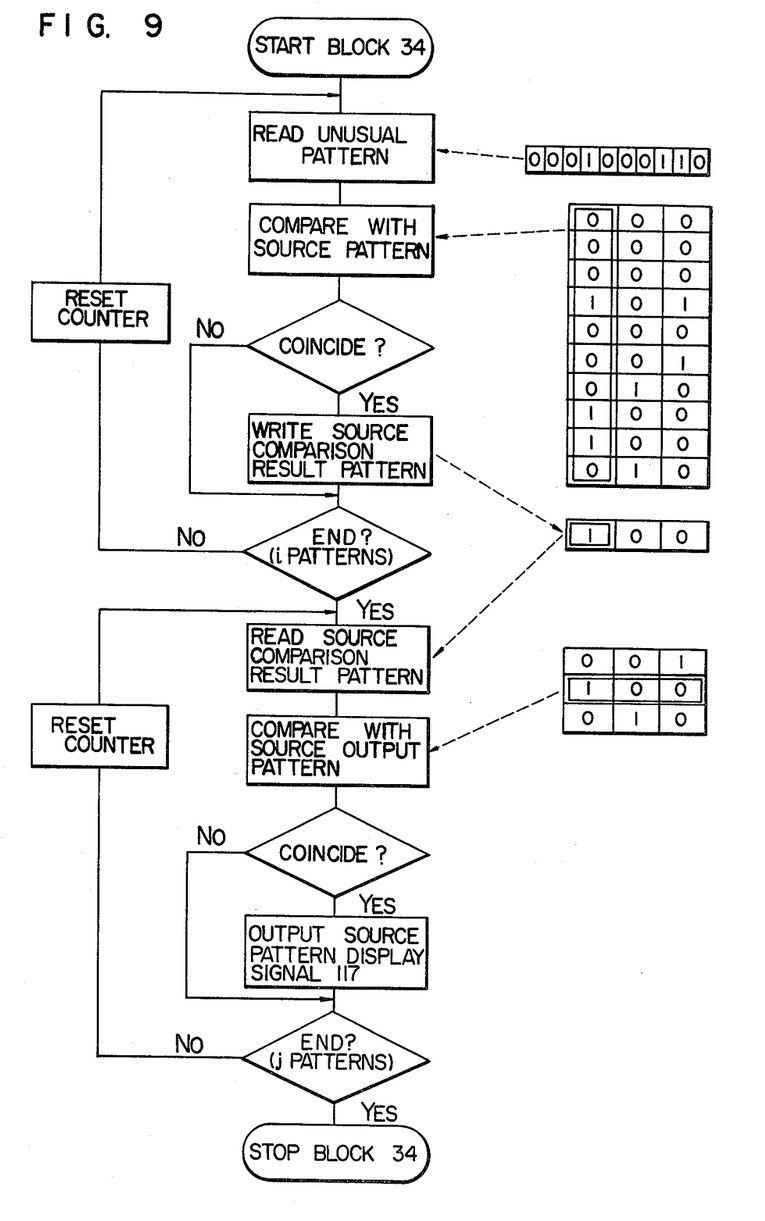
FIG. 9 is a flow chart showing the manner of data processing according to the method of vibration diagnosis shown in FIG. 6.

Then, such an unusual pattern "0001000110" is read from an unusual pattern table as shown in a flow chart in FIG. 9, and judgement is made as to whether this unusual pattern coincides with any one of i source patterns including a first source pattern "0001000110", a second source pattern "0000001001" and a third source pattern "0001010000" as shown in FIG. 7. When the result of judgement proves that the unusual pattern coincides with the first source pattern "0001000110", "1" is written in a source comparison result pattern. When the unusual pattern does not coincide with the first source pattern, "1" is not written, and the counter is reset to proceed to the next step in which the unusual pattern is compared with the second source pattern. Similar processing is carried out until the unusual pattern coincides with one of the i (=3 herein) source patterns. In the illustrated example, a source comparison result pattern "100" is obtained since the unusual pattern coincides with the first source pattern and does not coincide with the remaining second and third source patterns.

Then, such a source comparison result pattern "100" is read out to be compared with j source output patterns including a first source output pattern or metal peel-off pattern "001", a second source output pattern or metal rubbing pattern "100" and a third source output pattern or oil shortage pattern "010" as shown in FIG. 7. When the result of comparison proves that the source comparison result pattern coincides with the metal peel-off pattern, the corresponding source pattern identification signal 117 appears from the unusual pattern identifier 34, but such a signal does not appear when no coincidence is detected. In this latter case, the counter is reset to proceed to the next step in which the source comparison result pattern is now compared with the metal rubbing pattern. Similar processing is carried out until the source comparison result pattern coincides with one of the j (=3 herein) source output patterns. In the illustrated example, the source comparison result pattern coincides with the metal rubbing pattern and does not coincide with the remaining metal peel-off pattern and oil shortage pattern. Consequently, the source pattern identification signal 117 indicative of the metal rubbing pattern appears from the unusual pattern identifier 34 so that the source of unusual vibration can be identified as the rubbing of the metal of the jounal bearing.

Although the occurrence-frequency distribution pattern is employed for the purpose of trend analysis in the aforementioned embodiment of the present invention, it is apparent that any other suitable means may be employed in lieu thereof. Further, besides the correlation signals such as the casing vibration signal and the oil flow-rate signal used in the embodiment of the present invention, another plant variable signal indicative of the plant variable such as the steam temperature, steam pressure, metal temperature, vacuum or load, or a monitor signal such as an output signal from the fine particle monitor in the generator may be used, or a suitable combination of such signals may also be used.

It will be understood from the foregoing detailed description that the present invention can attain early detection of unusual vibration of a rotary machine under operation and can automatically identify the source of unusual vibration. Therefore, the desired trouble-free operation of the rotary machine can be ensured by suitably selecting, for example, the rotation speed or load depending on the result of identification of the source of unusual vibration.

We claim:

1. A method of diagnosing vibration of a rotary machine for determining unusual vibration thereof, comprising the steps of:
   detecting vibration of a rotary shaft of the rotary machine and producing a shaft vibration signal representative thereof;
   analyzing said shaft vibration signal and producing a frequency spectrum signal indicative of the level of at least one of predetermined frequency components of said shaft vibration;

providing a spectrum setting signal representing a predetermined level of said frequency component;

comparing said frequency spectrum signal with said spectrum setting signal and producing an unusual spectrum signal indicative of whether said frequency spectrum signal exceeds said spectrum setting signal;

converting said shaft vibration signal into an occurrence-frequency distribution signal representative of a distribution pattern of values measured in a predetermined time interval by time-related analysis of at least one component of the shaft vibration signal;

providing an occurrence-frequency distribution pattern setting signal;

comparing said occurrence-frequency distribution signal with at least one of individual predetermined distribution patterns represented by said occurrence-frequency distribution pattern setting signal and producing an unusual occurrence-frequency distribution pattern signal indicative of when said occurrence-frequency distribution signal substantially corresponds with a specific one of said individual distribution patterns represented by the occurrence-frequency distribution pattern setting signal;

providing a source pattern signal; and comparing respective portions of at least one of predetermined source patterns represented by said source pattern signal respectively with the unusual spectrum signal and the unusual occurrence-frequency distribution pattern signal for producing a source pattern identification signal representative of a source of unusual vibration of the rotary machine.

2. A method according to claim 1, comprising the further steps of:

providing a correlation signal indicative of at least one operating condition of the rotary machine other than vibration of the rotary shaft;

comparing said correlation signal with a correlation variable setting signal and producing an unusual correlation variable signal representative of whether said correlation signal exceeds said correlation variable setting signal;

comparing said unusual correlation variable signal with a respective portion of said at least one of the predetermined source patterns represented by the source pattern signal; and producing said source pattern identification signal when the unusual spectrum signal, unusual occurrence-frequency distribution pattern signal and unusual correlation variable signal all substantially correspond to their respective portions of a source pattern represented by the source pattern signal.

3. A method according to claim 1 or 2, wherein said at least one component of said shaft vibration signal includes the level or phase of a predetermined frequency component of said shaft vibration signal and the rectification of said shaft vibration signal.

4. A method according to claim 1 or 2, wherein said occurrence-frequency distribution signal and said occurrence-frequency pattern setting signal are each in the form of an occurrence-frequency distribution of the measured values in the predetermined time interval for each of the components of the shaft vibration in respective predetermined ranges of the values.

5. A method according to claim 4, wherein said predetermined distribution patterns include at least a first pattern in which the values occur most frequently in a discrete narrow range and less frequently in another range spaced from the narrow range, a second pattern in which the values occur with substantial frequencies over a predetermined wide range and a third pattern in which the values occur substantially equally in two discrete narrow ranges substantially spaced from each other and does not occur in a range disposed therebetween.

6. A method according to claim 1 or 2, wherein the value measured is of the rate of variation of the component of the shaft vibration in a predetermined period of time.

7. A method according to claim 1 or 2, wherein said at least predetermined frequency component comprises a component of the frequency of rotation of the rotary shaft.

8. A method according to claim 2, wherein the operating conditions of the rotary machine, at least one of which is indicated by the correlation signal, include oil flow rate supplied to a bearing incorporated in the rotary machine, temperature of a selected portion of the rotary machine, load applied to the rotary machine, and steam temperature and steam pressure of a steam machine coupled to the rotary machine.

9. A method according to claim 1 or 2, wherein said predetermined frequency components, at least one of which is indicated by the frequency spectrum signal, include components of the primary natural frequency of the rotary machine, the rotation frequency of the rotary shaft and at least one of the harmonics of the rotation frequency of the rotary shaft.

10. A method according to claim 1 or 2, wherein the rotary machine is an electric power generating machine.

* * * * *